United States Patent
Korthals et al.

(10) Patent No.: US 6,782,964 B1
(45) Date of Patent: Aug. 31, 2004

(54) MOWER

(75) Inventors: Douglas Dean Korthals, Fuquay-Varina, NC (US); Randall Joseph Bischel, Fuquay-Varina, NC (US); Ellis Rudolph West, Dunn, NC (US)

(73) Assignee: Deere & Company, Moline, IL (US)

(*) Notice: Subject to any disclaimer, the term of this patent is extended or adjusted under 35 U.S.C. 154(b) by 144 days.

(21) Appl. No.: 10/270,775

(22) Filed: Oct. 11, 2002

(51) Int. Cl.[7] .............................................. B60K 28/00
(52) U.S. Cl. ...................... 180/273; 180/90.6; 188/109; 56/10.8
(58) Field of Search ................................ 180/273, 333, 180/90.6; 188/109; 56/10.8, 16.7, 16.9, 17.4

(56) References Cited

U.S. PATENT DOCUMENTS

| | | | |
|---|---|---|---|
| 4,499,963 A | * 2/1985 | Liston ........................ | 180/90.6 |
| 4,998,948 A | 3/1991 | Osterling | |
| 5,406,778 A | * 4/1995 | Lamb et al. ...................... | 56/7 |
| 5,507,138 A | 4/1996 | Wright et al. | |
| 5,600,944 A | 2/1997 | Wright et al. | |
| 5,765,347 A | 6/1998 | Wright et al. | |
| 5,794,422 A | * 8/1998 | Reimers et al. .............. | 56/11.9 |
| 5,809,755 A | 9/1998 | Velke et al. | |
| 5,809,756 A | 9/1998 | Scag et al. | |
| 5,934,400 A | * 8/1999 | Larsen et al. ............... | 180/170 |
| 5,984,031 A | 11/1999 | Velke et al. | |
| 6,059,055 A | 5/2000 | Velke et al. | |
| 6,094,897 A | 8/2000 | Velke et al. | |
| 6,138,446 A | 10/2000 | Velke et al. | |
| 6,189,304 B1 | 2/2001 | Velke et al. | |
| 6,205,753 B1 | 3/2001 | Velke et al. | |
| 6,234,495 B1 | * 5/2001 | Velke ........................ | 280/32.7 |
| 6,276,486 B1 | 8/2001 | Velke et al. | |
| 6,327,839 B1 | 12/2001 | Velke et al. | |
| 6,390,225 B2 | 5/2002 | Velke et al. | |
| 6,484,827 B2 | * 11/2002 | Teal et al. .................... | 180/6.2 |
| 6,490,849 B1 | 12/2002 | Scag et al. | |
| 6,540,633 B1 | * 4/2003 | Hasegawa et al. ............ | 475/24 |
| 6,648,094 B2 | * 11/2003 | Abend et al. ............... | 180/367 |

OTHER PUBLICATIONS

Great Dane "Super Surfer" photographs taken by a Deere & Company employee at least as early as Jul. 2002.

* cited by examiner

*Primary Examiner*—Paul N. Dickson
*Assistant Examiner*—Toan C To

(57) ABSTRACT

A platform included as part of a mower, the platform providing a surface upon which an operator stands while operating the mower. The platform is springably or suspendably mounted on the frame of the mower to cushion the operator and thereby decrease the amount of physical exertion which may be experienced by the operator over long periods of operation. The platform is further associated with a power control mechanism operatively connected with the platform whereby operation of the mower attachment(s) are selectively controllable by the operator stepping onto or off of the platform.

13 Claims, 6 Drawing Sheets

MOWER

THE DRAWINGS

DETAILED DESCRIPTION OF THE DRAWINGS

Figure 1:
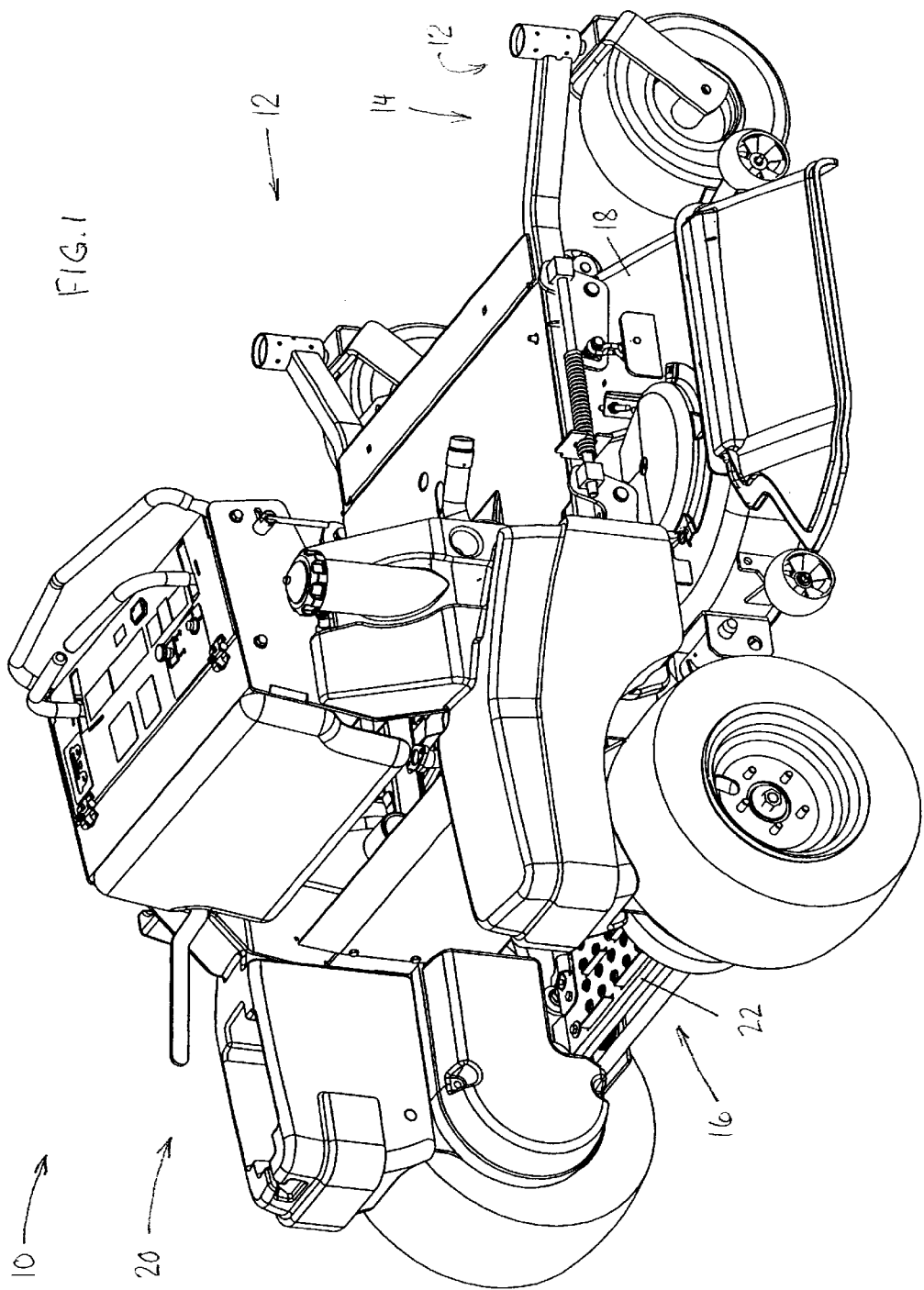
FIG. 1 is a side and elevated view of a vehicle, as described in the present disclosure.

Looking to FIG. 1, there is shown a vehicle, in the form of a mower 10, on which an operator stands during its use. The mower 10 includes a frame 12 having front and rear portions 14 and 16, respectively. A cutting deck 18 is suspended from the front portion 14 of the frame 12 for cutting grass and other vegetation. At the rear portion 16 of the frame 12, a control/operator's station 20 is shown. The station 20 accommodates an operator in a standing position during operation of the mower 10. It is to be noted that although the vehicle discussed herein is a mower, other types of vehicles on which an operator stands during operation thereof are also contemplated; accordingly, such other types of vehicles are foreseen as being adaptable to the structure that is discussed throughout the Detailed Description.

Figure 2:
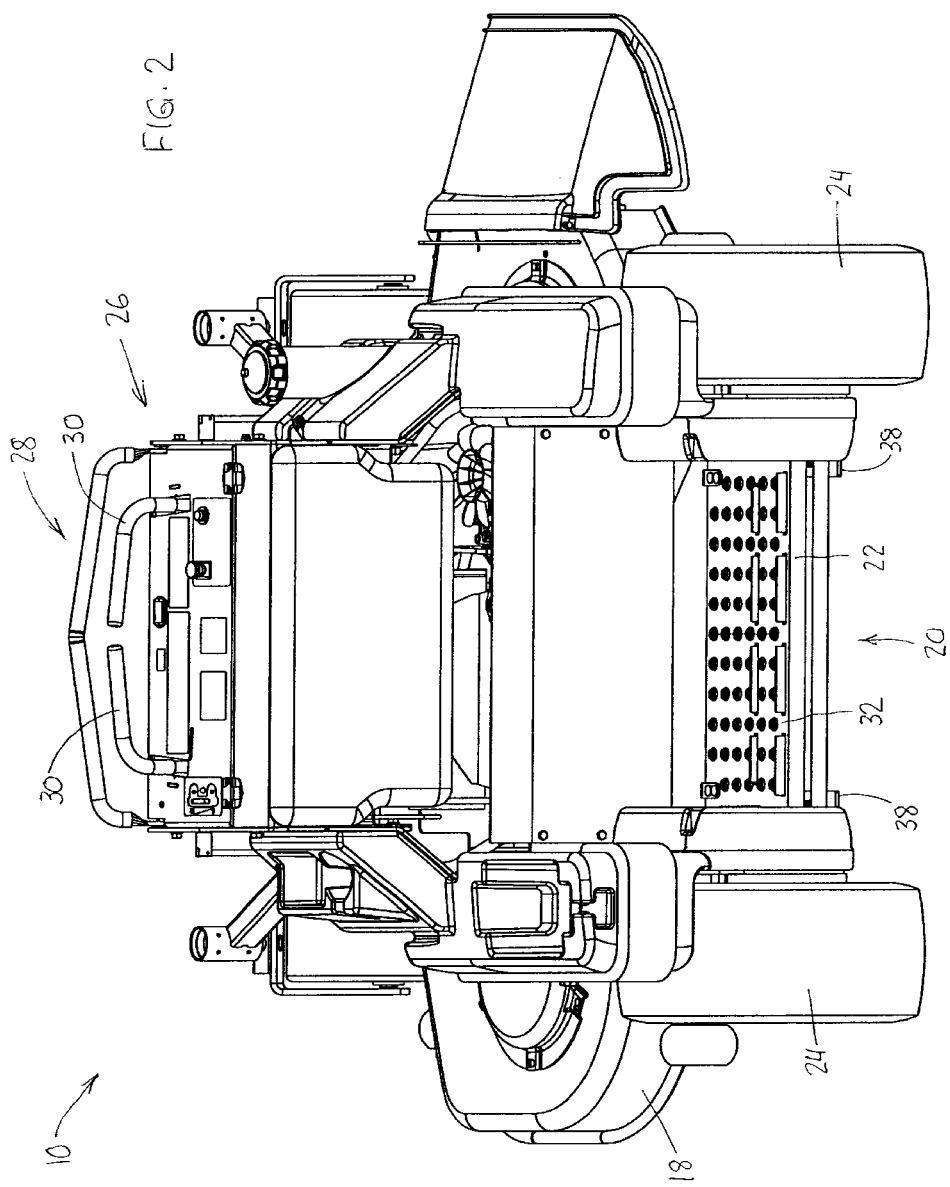
FIG. 2 is a rear and elevated view of the vehicle according to FIG. 1.

Looking now to FIG. 2, it can be seen that the operator's station 20 includes a platform 22 extending between and within the extent of two rear wheels 24. A control panel 26 is provided above and forwardly of the platform 22. The control panel 26 has associated therewith various controls 28 for operating the mower 10. The controls 28 include steering levers 30 which are used in directing movement of the mower 10. Referring to FIG. 1 in conjunction with FIG. 2, it is to be understood that the platform 22 is located, optionally, at the position and elevation shown in order to provide the operator with an ability to extend his or her arms forwardly. An ability for such forward extension enables the operator to manipulate the steering levers 30 located atop the control panel 26 while standing on the platform 22.

Figure 3:
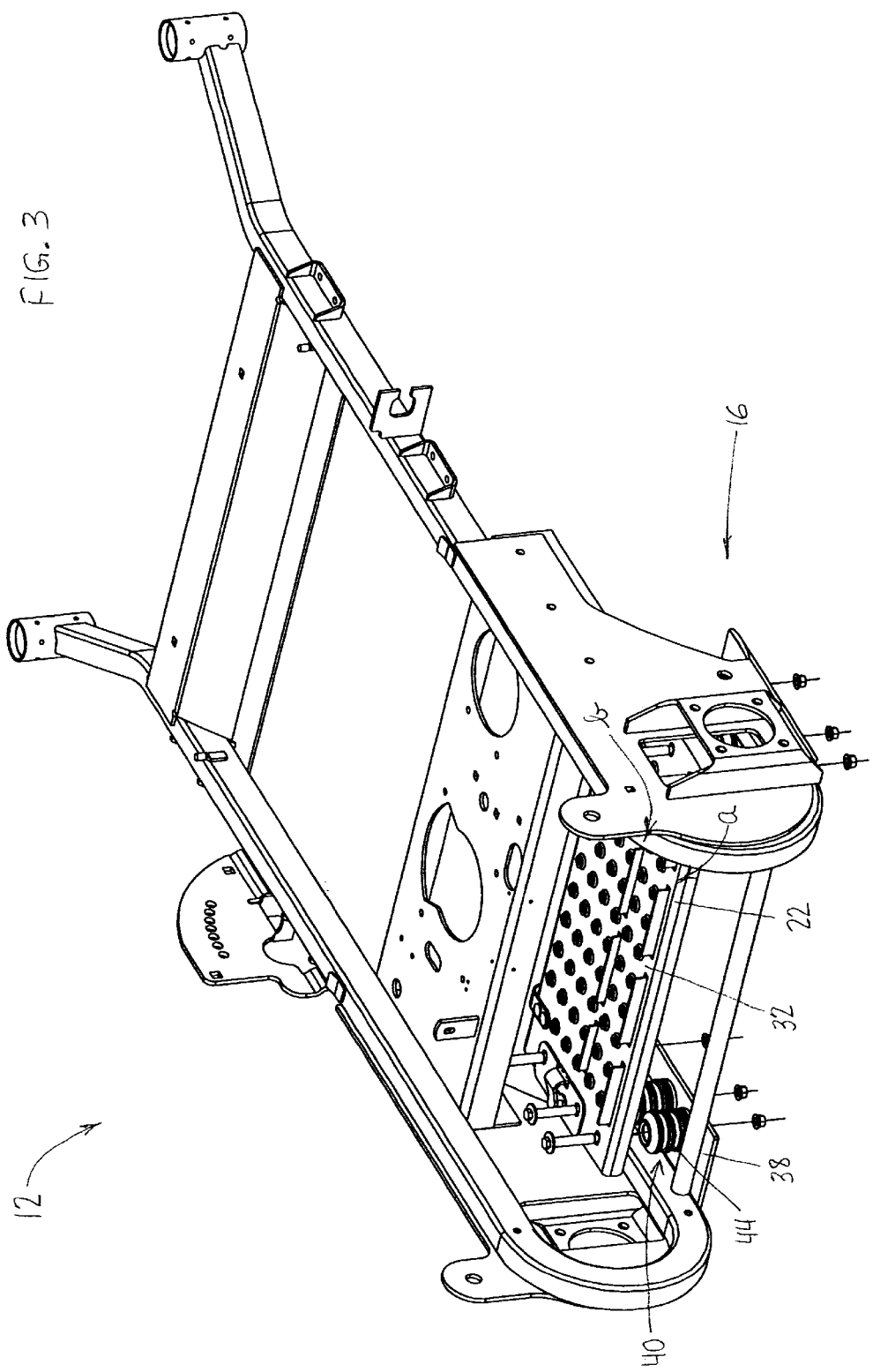
FIG. 3 is a rear and side elevated view of a portion of the vehicle, as described in the present disclosure.
Figure 4:
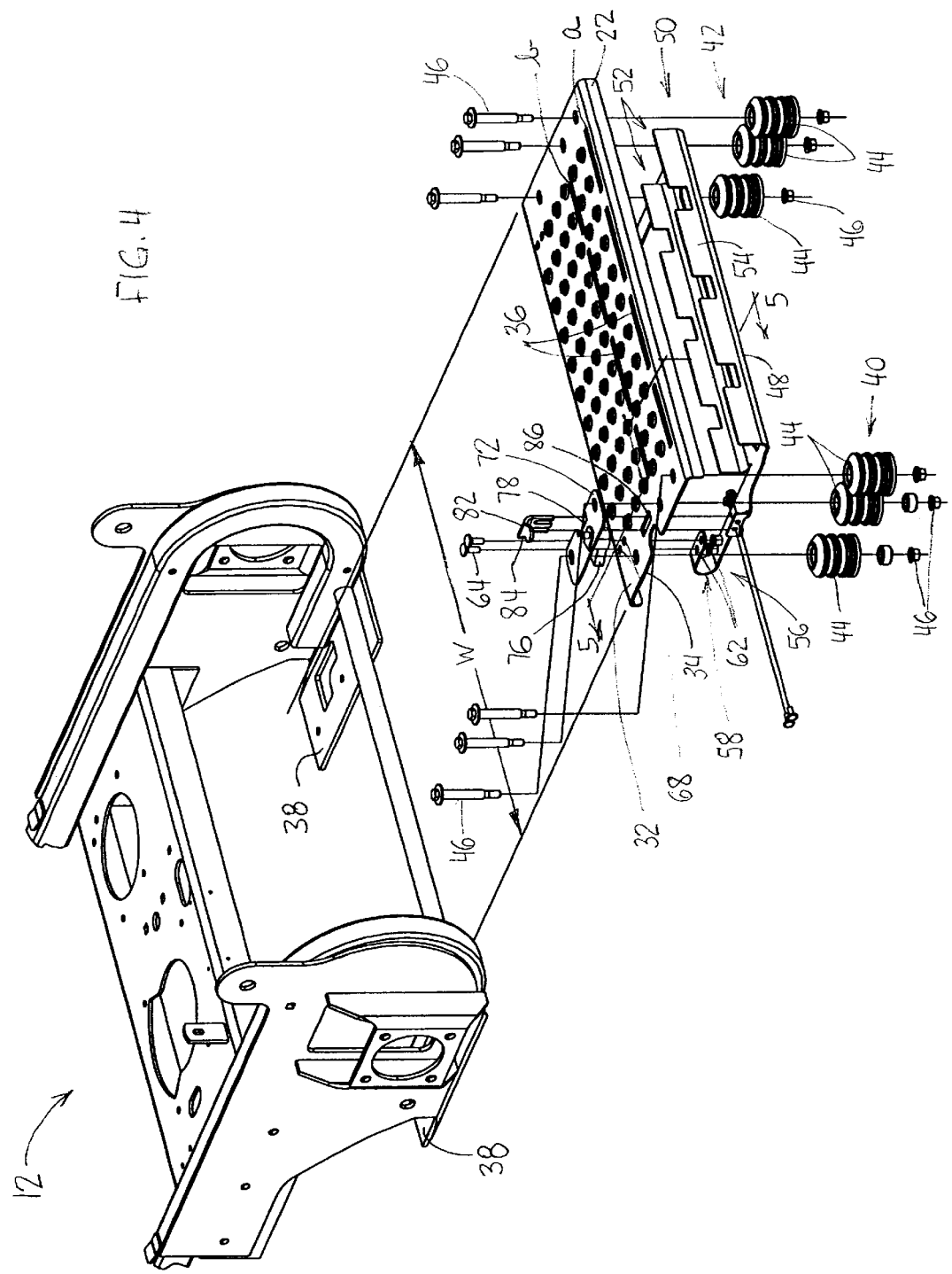
FIG. 4 is a rear and side elevated view showing portions of the vehicle in exploded form.

Referring to FIGS. 3 and 4, the frame 12 is viewed in isolation from the rest of the mower 10 to better show the location and connection of the platform 22 thereon. As can be seen, the platform 22 is formed, optionally, as a grate-like support platform having top and bottom sides 32,34 and a number of apertures, optionally in the form of slots 36 which, as shown, occur in first and second spaced rows a,b. Use of the term "grate-like support platform" contemplates all of those structures being formed as a singular plate, or a joined collection thereof to form a single unit, which include(s) a series of apertures spaced therethrough.

Referring to FIGS. 2–4, the frame 12 includes surfaces 38 that extend between the rear wheels 24. Groups 40,42 of springs 44, made optionally of rubber such as neoprene or other material(s) having characteristics similar in nature, are mounted with the surfaces 38 so as to be sandwiched between the platform 22 and the support surfaces 38. The springs 44 are held in contact with the platform 22 and the support surfaces 38 through the use of the bolt and nut combinations 46 so as to suspendably mount the platform 22 with the frame 12. Because the springs 44 are mounted at the location discussed, the platform 22 is movable vertically so as to cushion an operator while standing thereon.

FIG. 4 provides a more detailed illustration of the platform 22 and its association with the frame 12. In particular, the platform 22 further includes a bar 48 that is provided, optionally, as having the characteristics of a leaf spring. The bar 48 includes at a first end 50 thereof first and second rows 52 of upstanding portions, optionally provided in the form of ribs 54. At a second end 56 of the bar 48, a curled portion 58 is formed thereat and has a set of apertures 62 therethrough for enabling connection of the bar 48 to the platform 22, as later discussed.

Figure 5:
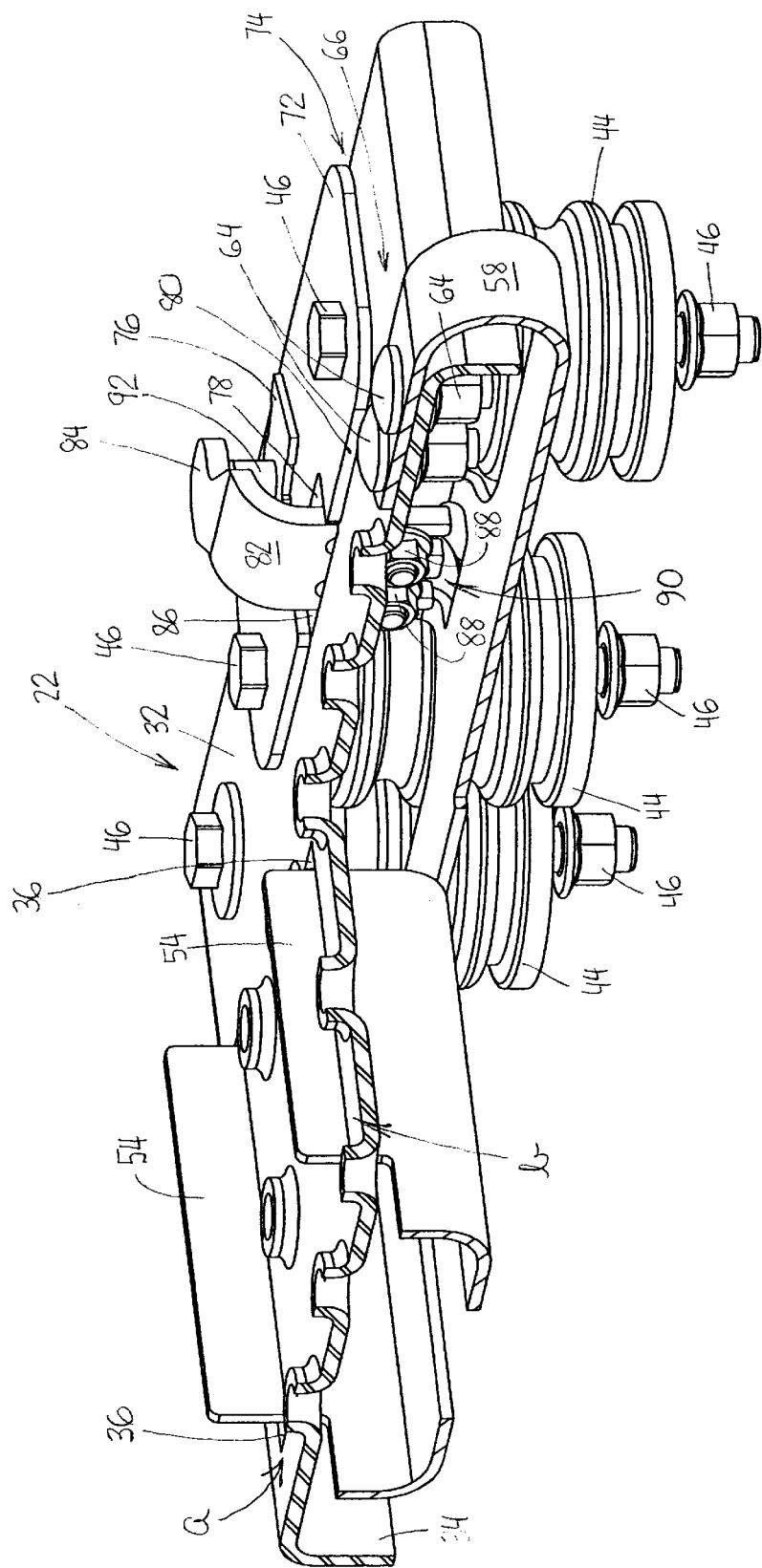
FIG. 5 is a sectional view taken generally along lines 5—5 of FIG. 4 wherein the elements are not exploded from one another and are shown according to a first position.

The bar 48 is connected to the platform 22 through the use of bolt and nut combinations 64, as shown at 66 in FIG. 5. Looking again to FIG. 4, the bolts are passed through the apertures 62 of the curled portion 58 as well as through a set of apertures 68, in the platform 22, which align with the apertures 62. When looking again to FIG. 3, it can be seen that the ribs 54 matingly engage with the apertures 36 of the platform 22 and are inserted therethrough in the absence of force on the ribs 54. It is to be understood that the ribs 54 could be provided as other similarly sized extensions which could project through the apertures 36.

With further reference to FIGS. 4 and 5, a mounting plate 72 is shown connected with the platform 22 at 74. A power control mechanism, optionally provided as a switch 76, is attached with the platform 22 so as to extend above and below the top sides of each of the platform 22 and mounting plate 72. Opposite the switch 76, the mounting plate 72 includes a notch 78 on a side 80 thereof. A clip 82 having, optionally, a tab 84 extending therefrom is interfitted within an opening 86 in the platform 22 such that the tab 84 projects over and above the notch 78. The clip 82 is held within the opening 86 by bolt and nut combinations 88 which connect the clip 82 with the bar 48 as shown at 90 in FIG. 5.

The switch 76 is readily connectable with a power distribution device or source such as a power take-off (PTO) (not shown). Further, the switch 76 is operable with the bar 48 to form an operator presence control that either permits or does not permit power to be transmitted from the PTO to devices such as implements connected with the mower 10. To control the transmission of power, a switch plunger 92 (which is formed as part of the switch 76 as seen in FIG. 5) is movable between alternate first and second positions during operation of the mower 10.

Figure 6:
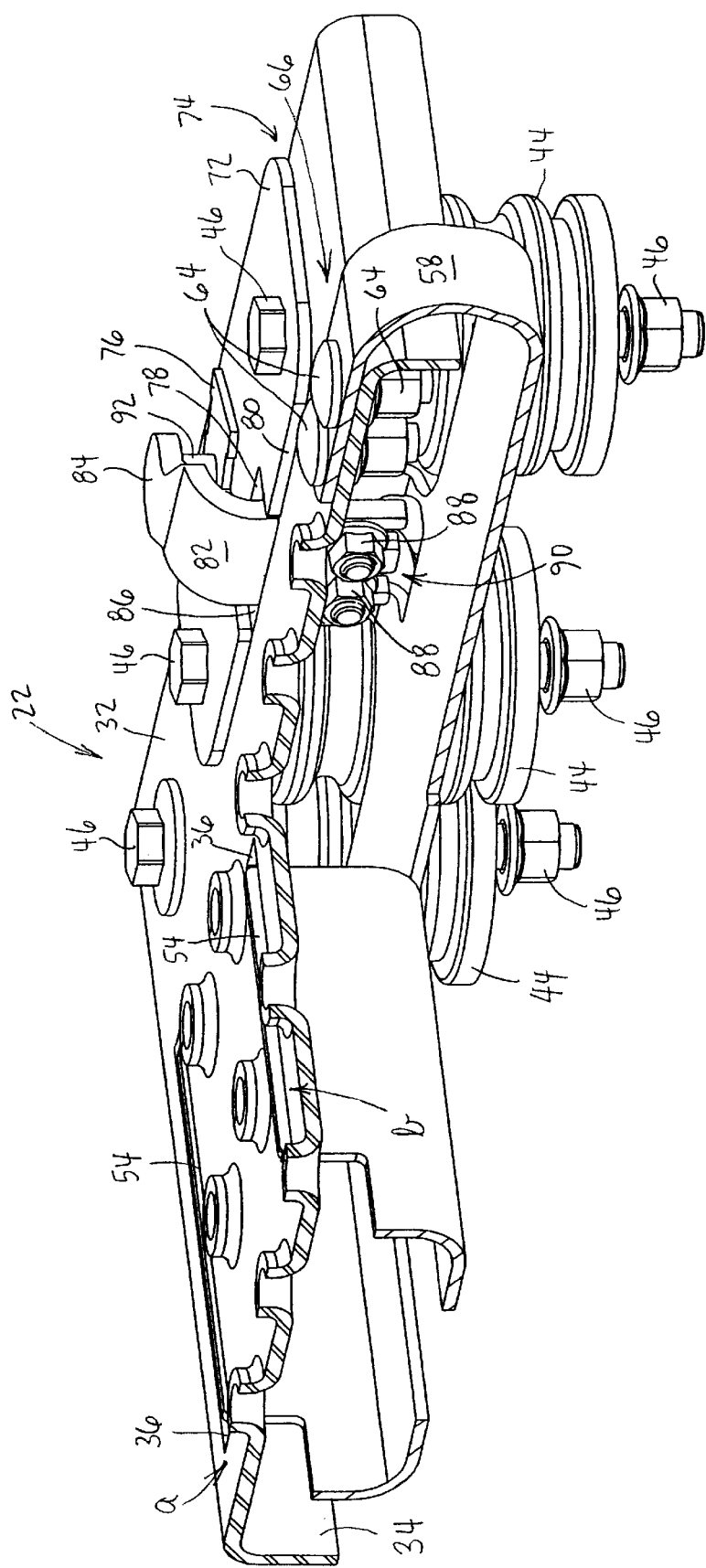
FIG. 6 is a further sectional view taken generally along lines 5—5 of FIG. 4 wherein the elements are not exploded from one another and are shown according to a second position.

Movement between the alternate positions of the switch plunger 92 depends on whether force is placed upon one or all of the ribs 54 of the bar 48. When force is placed upon one or all of the ribs 54 (as in the situation when the operator stands on the platform 22 and across its width "w" so as to be supported thereby), they are depressed, or biased, to a position which is substantially at or below the top surface of the platform 22 dependent upon the amount of force exerted thereon. Because the ribs 54 are depressed to this position, as shown in FIG. 6, and the connection of the clip 82 to the bar 48 as shown in FIGS. 4 and 5, the tab 84 bears down on the plunger 92 so as to cause it to operate according to its first position. In this first plunger position, the switch 76 permits power to be transferred from the PTO to the implement(s), as intended. In the absence of force upon one or all of the ribs 54, they extend through the slots 36 of the platform 22, as shown in FIG. 5. When the ribs 54 are in this position, the tab 84 of the clip 82 rests on, or is above, the switch plunger 92 without applying a significant pressure on it. In this situation, the switch 76 operates according to its second plunger position in which power is not permitted to flow from the PTO to the mower implement(s).

Thus, there is provided a mower having an operator station including a platform which is cushioned to support an operator when standing thereon. While providing such cushioning, the platform is further associated with a switch which is cooperable therewith so as to enable the operator to regulate or maintain the flow of power to an implement attached with the mower.

It is contemplated that the bar and the clip, as described above, could be made as a one-piece construction in an effort to minimize the number of component parts necessary to cause movement of the switch between its alternate positions. It is further contemplated that the platform and the bar could be manufactured in a similar fashion for a similar purpose.

Having provided the above description, it will become apparent that various modifications can be made without departing from the scope of that description as further defined in the accompanying claims.

We claim:

1. A vehicle comprising:
   a) a frame;
   b) a platform having a top surface, the platform being mounted with the frame, and including at least one aperture;
   c) a member connected to the platform, the member comprising at least one upstanding portion which is extendable through the at least one aperture and movable to a position substantially at or below the top surface of the platform in response to the placement of a force thereupon; and
   d) a power control mechanism operatively associated with the platform and the member, and adapted for connection with a power source, the control mechanism being operable between at least two positions for controlling the flow of power between the power source and an associated device, movement from one of the at least two positions to the other thereof being caused in response to movement of the at least one upstanding portion.

2. The vehicle as recited in claim 1 wherein:
   the platform comprises at least a set of apertures and the member comprises at least a set of upstanding portions.

3. The vehicle as recited in claim 2 wherein:
   the at least one set of apertures are similarly arranged and the at least one set of upstanding portions are similarly arranged.

4. The vehicle as recited in claim 3 wherein:
   the apertures and the upstanding portions are arranged in rows.

5. The vehicle as recited in claim 1 wherein:
   the power control mechanism is a switch adapted for connection with the power source carried by the vehicle.

6. The vehicle as recited in claim 1 further comprising:
   at least one spring associated with the frame and the platform.

7. The vehicle as recited in claim 6 wherein:
   the platform is mounted with the frame, and the at least one spring extends between the platform and the frame for permitting movement of the platform relative to the frame.

8. The vehicle as recited in claim 7 wherein:
   the platform is adapted for supporting an operator, the associated weight thereof representing the force to be placed on the platform and the at least one upstanding portion.

9. The vehicle as recited in claim 1 wherein:
   the platform is adapted for supporting an operator, the associated weight thereof representing the force to be placed on the platform and the at least one upstanding portion.

10. The vehicle as recited in claim 9 wherein:
    the platform comprises multiple apertures and the member comprises multiple upstanding portions, each of the upstanding portions being extendable through a respective one of the apertures.

11. The vehicle as recited in claim 10 wherein:
    the upstanding portions are spaced generally across the width of the platform such that placement of the operator's weight on the platform depresses the upstanding portions to a position substantially at or below the top surface of the platform, thereby moving the power control mechanism to one of its positions to permit the flow of power between the power source and the associated device.

12. A vehicle comprising:
    a) a frame; and
    b) an operator station mounted with the frame, the operator station comprising
       a platform mounted to the frame for providing a surface on which an operator may stand, the platform being supported upon at least one spring so as to be movable in response to a force applied thereon, the platform comprising apertures therethrough;
       a member connected with the platform, the member comprising substantially upstanding portions extending from the member which project through the apertures, the upstanding portions being movable into and out of the apertures in response to the application of a force thereon; and
       a power control mechanism mounted with the platform and the member, and adapted for connection with a power source, movement of the upstanding portions in proximity to the apertures permitting operation of the control mechanism so as to control the flow of power associated with the power source.

13. A vehicle comprising:
    a) a frame having front and rear portions, and being supported upon ground engaging wheels; and
    b) an operator station comprising
       a platform for supporting an operator of the vehicle, the platform being mounted to the rear portion of the frame,
       a plurality of springs mounted with the frame and the platform, the platform being suspended on the springs so as to accommodate at least vertical movement above the frame in response to a force thereon, the platform further including sets of similarly arranged slots therethrough;
       a bar connected with the platform, the bar including sets of upstanding ribs, the ribs being depressable within the slots in response to the application of force thereon; and
       a switch connected with the platform and the bar, and adapted for connection with a power source, the switch and the bar comprising an operator presence control, the switch being operable to a first position to activate the power source, or, to a second position to deactivate the power source, activation of the power source being caused by movement of the switch to its first position in which the ribs are depressed to a position which is substantially at or below a top surface of the platform, deactivation of the power source being caused by movement of the switch to its second position in which the ribs are free from force thereon such that they extend above the platform.

* * * * *